(12) United States Patent
Fei et al.

(10) Patent No.: US 9,913,088 B2
(45) Date of Patent: Mar. 6, 2018

(54) APPARATUS AND METHOD FOR IDENTIFYING RADIO LOCATIONS RELATIVE TO A GEO-FENCE

(71) Applicant: MOTOROLA SOLUTIONS, INC, Chicago, IL (US)

(72) Inventors: Xun Fei, Chendu (CN); Da-Jun Chen, Chengdu (CN); Wen Feng, Chengdu (CN); Ya-Hui Gong, Chengdu (CN); Yong Tian, Chengdu (CN)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 0 days.

(21) Appl. No.: 15/506,835

(22) PCT Filed: Nov. 27, 2014

(86) PCT No.: PCT/CN2014/092406
§ 371 (c)(1),
(2) Date: Feb. 27, 2017

(87) PCT Pub. No.: WO2016/082163
PCT Pub. Date: Jun. 2, 2016

(65) Prior Publication Data
US 2017/0280285 A1  Sep. 28, 2017

(51) Int. Cl.
*H04W 4/00* (2009.01)
*H04W 4/02* (2018.01)
(Continued)

(52) U.S. Cl.
CPC .............. *H04W 4/021* (2013.01); *G01S 5/10* (2013.01); *H04W 4/04* (2013.01); *H04W 64/003* (2013.01); *G06F 2221/2111* (2013.01)

(58) Field of Classification Search
CPC ..... H04W 4/021; H04W 64/00; H04W 4/022; H04M 1/72577
(Continued)

(56) References Cited

U.S. PATENT DOCUMENTS 7,680,590 B2   3/2010   Sanqunetti
8,320,931 B2   11/2012  Ward et al.
(Continued)

FOREIGN PATENT DOCUMENTS

CN    103413095 A      11/2013
WO    2010042802 A1    4/2010
WO    2013181441 A2    12/2013

OTHER PUBLICATIONS

The International Search Report and the Written Opinion, corresponding patent application No. PATCN2014/092406, filed: Nov. 27, 2014, all pages.

*Primary Examiner* — Sam Bhattacharya

(57) ABSTRACT

A communication device receives coordinates for an inner area and an outer area associated with a geo-fence. The communication device determines its current location coordinate and determines how the current location coordinate relates to the coordinates for the inner area and the outer area. The communication device discovers, using the current location coordinate and the coordinates for the inner area and the outer area, that the communication device is located outside of the inner area and inside of the outer area. Responsive to the discovering, the communication device sends a query to a network equipment to determine the current location of the communication device relative to the geo-fence. The communication device receives information associated with an intermediate area and uses the information associated with the intermediate area to determine the current location of the communication device relative to the geo-fence.

16 Claims, 5 Drawing Sheets

(51) Int. Cl.
  *G01S 5/10*    (2006.01)
  *H04W 64/00*   (2009.01)
  *H04W 4/04*    (2009.01)

(58) Field of Classification Search
  USPC ............ 455/456.1, 456.2, 456.3, 456.6, 457
  See application file for complete search history.

(56) References Cited

U.S. PATENT DOCUMENTS

| | | |
|---|---|---|
| 8,471,701 B2 | 6/2013 | Yariv et al. |
| 8,577,590 B2 | 11/2013 | Doyle |
| 8,731,813 B2 | 5/2014 | Sheha et al. |
| 2013/0169433 A1 | 7/2013 | Eitan et al. |
| 2014/0141784 A1 | 5/2014 | Schmidt et al. |
| 2014/0215588 A1 | 7/2014 | Sayed |
| 2014/0302879 A1 | 10/2014 | Kim et al. |

APPARATUS AND METHOD FOR IDENTIFYING RADIO LOCATIONS RELATIVE TO A GEO-FENCE

This application is a National Stage filing under 35 USC § 371 of co-pending Patent Cooperation Treaty international application having Serial No. PCT/CN14/92406 (the 'PCT international application') filed on Nov. 27, 2014. This application claims priority to the PCT international application, the entire contents of which are incorporated herein by reference.

BACKGROUND OF THE INVENTION

A communication system may include portable/mobile communication devices that are configured to transmit information directly to each other or through fixed network equipment (FNE), such as a base station 106. The portable/mobile communication devices may be radios, for example, portable two-way radios, mobile radios, or other similar portable or mobile voice communication devices. The radios may operate within a geographic area that has a virtual perimeter or virtual boundary (referred to herein as a geo-fence).

Radios facilitate communications between operating users by transmitting and receiving information on a group of pre-assigned frequency channels. When a radio enters or exits a geographic area defined by a geo-fence, the radio may perform operations associated with entering or exiting the geo-fence. For instance, when a radio enters or exits a geo-fence, the radio may automatically change frequency channels or perform vehicle tracking. In a current implementation, the FNE controls geo-fencing operations, wherein each radio periodically reports its location coordinates obtained from, for example, a global positioning satellite (GPS) and/or via a triangulation process to the FNE. The FNE determines a geo-fence boundary, determines, using a radio's location coordinates, when the radio crosses the geo-fence boundary and informs the radio that the radio has crossed the geo-fence boundary for the radio to perform operations associated with entering or exiting the geo-fence.

In another implementation, geo-fencing operations are controlled by the radio, wherein the FNE sends a geo-fence boundary to each radio and each radio tracks its current location and determines if it has crossed the geo-fence boundary. Both of these implementations increase the traffic between the FNE and radios because the radios have to periodically send their GPS coordinates to the FNE or the FNE needs to transmit the coordinates for a complete geo-fence boundary to all radios when a geo-fence is created or changed. The increased traffic between the FNE and the radios requires more frequencies and channels.

A virtual boundary may be of any shape, making the coordinates of a complicated geo-fence (for example, an irregular shaped geo-fence) difficult to accurately define. When the geo-fence is difficult to accurately define, the FNE may or may not transmit the correct geo-fence coordinates to the radios, for example, in the implementation where the radios control the geo-fencing operations.

Accordingly, there is a need for an improved apparatus and method for identifying radio locations relative to a geo-fence.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
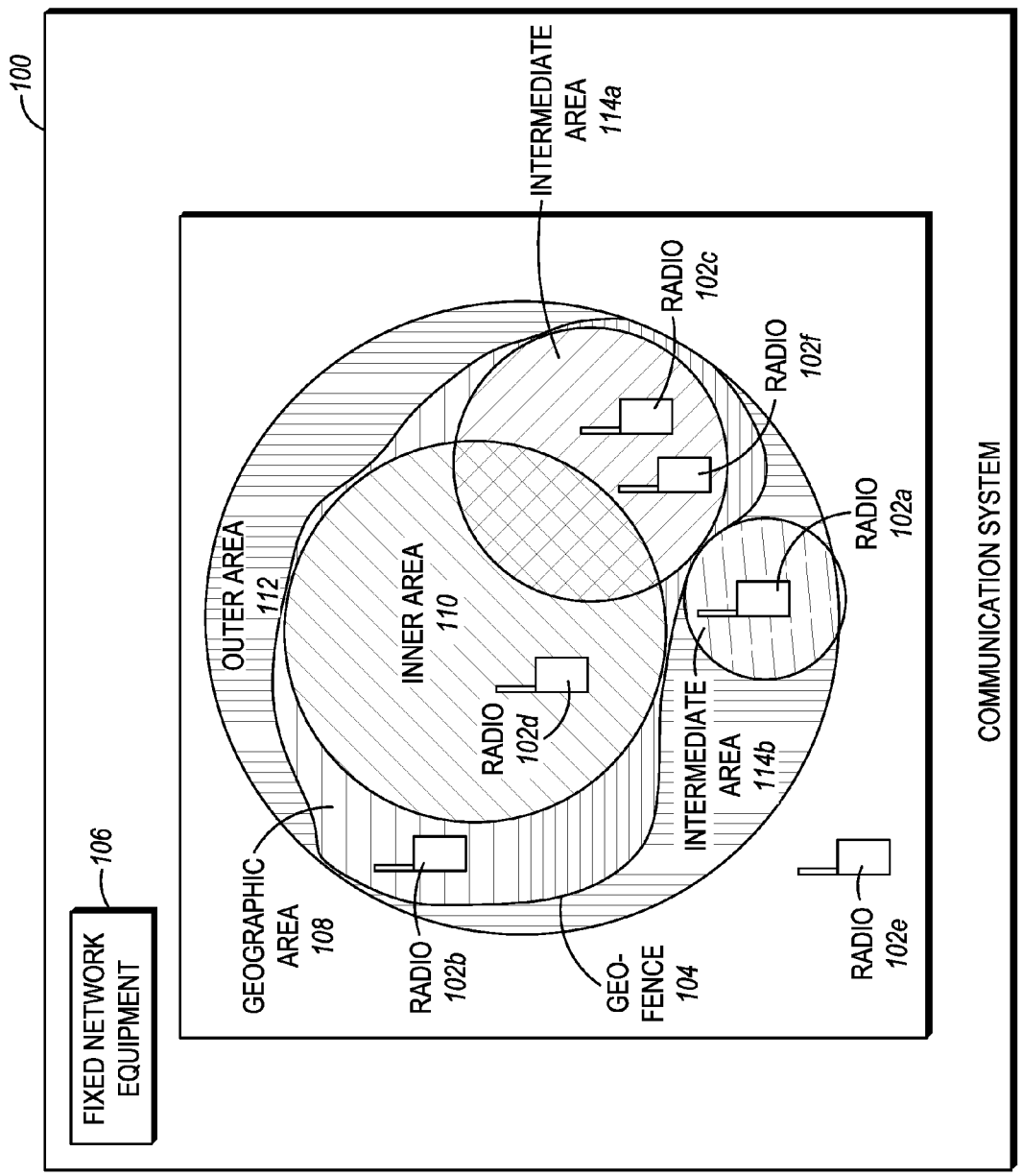
FIG. 1 is a block diagram of a communication system used in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

Some embodiments are directed to apparatuses and methods for identifying radio locations relative to a geo-fence. A communication device receives coordinates for an inner area and an outer area associated with a geo-fence. The communication device determines its current location coordinate and determines how the current location coordinate relates to the coordinates for the inner area and the outer area. The communication device discovers, using the current location coordinate and the coordinates for the inner area and the outer area, that the communication device is located outside of the inner area and inside of the outer area. Responsive to the discovering, the communication device sends a query to a network equipment to determine the current location of the communication device relative to the geo-fence. The communication device receives information associated with an intermediate area and uses the information associated with the intermediate area to determine the current location of the communication device relative to the geo-fence.

FIG. 1 is a block diagram of a communication system used in accordance with some embodiments. Communication system 100 may include portable/mobile communication devices that may be radios, for example, portable two-way radios, mobile radios, or other similar portable or mobile voice communication devices. The portable/mobile communication devices are referred to as subscribers 102 or radios 102 (i.e., radios 102a-102f) in this discussion. Radios 102 are used to facilitate communications between operating users by transmitting and receiving information on a group of pre-assigned frequency channels. Radios 102 may transmit information directly to each other or through fixed network equipment (FNE) 106, such as a base station. Other components of the communication system are not shown for ease of illustration.

When each radio 102 enters or exits a geographic area 108 that is defined by a geo-fence 104, the radio may perform operations associated with crossing geo-fence 104. Geo-fence 104 is a virtual perimeter or virtual boundary around a geographic area, for example, a virtual boundary around geographic area 108. To inform the radios of coordinates of geo-fence 104, FNE 106 broadcasts or otherwise transmits to radios 102, information associated with geo-fence 104. When, for example, the shape of the geo-fence is irregular, FNE 106 may broadcast or otherwise transmit, to radios 102, coordinates for an inner area 110 and outer area 112 associated with geo-fence 104. Inner area 110 is a region located within geo-fence 104. A portion of outer area 112 (referred to herein as a first region of outer area 112) is located within geo-fence 104 and a portion of outer area 112 (referred to herein as a second region of outer area 112) is located outside of geo-fence 104. The region covered by each of inner area 110 and outer area 112 may be configured to be a regular shaped region. For example, the region covered by each of inner area 110 and outer area 112 may be configured as a circular region, square region or rectangle region.

Subsequent to receiving coordinates for the inner area and the outer area associated with geo-fence 104, based on the current location information for each radio 102, those radios operating outside of inner area 110 and outer area 112 can determine that they are operating outside of geo-fence 104. For instance, subsequent to receiving coordinates for inner area 110 and outer area 112 associated with geo-fence 104, each radio 102 may determine its current location coordinates using, for example, GPS technology. Each radio 102 may also determine how its current location coordinates relate to the coordinates of inner area 110 and outer area 112.

When a radio 102 determines that its current location coordinates are outside of inner area 110 and outer area 112, the radio may determine that it is operating outside of the geo-fence, without the radio having to query FNE 106. For example, radio 102e can determine using its current location information and the coordinates of inner area 110 and outer area 112 that it is operating outside of geo-fence 104. When a radio 102 determines using its current location coordinates that it is operating in inner area 110, the radio may determine that it is operating inside of geo-fence 104, without the radio having to query FNE 106. For example, radio 102d can determine using its current location information and the coordinates of inner area 110 that it is operating inside geo-fence 104.

Using its current location coordinate and the coordinates for inner area 110 and outer area 112, a radio may discover that it is located outside of inner area 110 and inside of the outer area 112. Due to the irregular shape of geo-fence 104, those radios operating only inside outer area 112 cannot determine whether or not they are operating inside or outside of geo-fence 104. In response to the discovery that a radio is located outside of inner area 110 and inside of the outer area 112, the radio may further determine if it is operating inside or outside of geo-fence 104 by sending a query to FNE 106 to determine its location relative to geo-fence 104.

FNE 106 responds to each query by generating an intermediate area 114 and by broadcasting or otherwise transmitting coordinates or other information associated with intermediate area 114. The region covered by intermediate area 114 may be configured to be a regular shaped region. For example, the region covered by intermediate area 114 may be configured as a circular region, a square region or a rectangle region. Subsequent to receiving information associated with an intermediate area 114, radios 102 in outer area 112 may use the coordinates of intermediate area 114 to determine if they are operating inside or outside of geo-fence 104.

For instance, one or more of radios 102a-102c and 102f may send a query FNE 106 to determine whether they are operating inside or outside of geo-fence 104. In response to the query of, for example, radio 102c, FNE 106 defines an intermediate area 114a. Because radio 102c is located within geo-fence 104, FNE 106 defines intermediate area 114a to be the largest area, including the current location of radio 102c, that is located within geo-fence 104 and outer area 112 to minimize the number of queries sent from other radios 102 within the vicinity of radio 102c. FNE 106 broadcasts or otherwise transmits information for intermediate area 114a to radios 102 and identifies intermediate area 114a as being within geo-fence 104.

In response to the query of, for example, radio 102a, FNE 106 defines an intermediate area 114b. Because radio 102a is located outside of geo-fence 104, FNE 106 defines intermediate area 114b to be the largest area, including the current location of radio 102a, that is located outside of geo-fence 104 and within outer area 112 to minimize the number of queries sent from other radios 102 within the vicinity of radio 102a. FNE 106 broadcasts or otherwise transmits information for intermediate area 114b to radios 102 and identifies intermediate area 114b as being outside of geo-fence 104.

When radio 102f (also referred to herein as a second communication device) receives information about intermediate area 114a in response to the query from radio 102c, radio 102f determines from its current location that it is in intermediate area 114a. Accordingly, radio 102f may discover that it is within geo-fence 104 and radio 102f will not need to independently query FNE 106 to determine whether or not it is within geo-fence 104. Consider for example, that radio 102f or radio 102c moves from intermediate area 114a, if the moving radio is still located within outer area 112, the moving radio may determine whether or not it is located in another intermediate area. For instance, if radio 102f determines that it is within intermediate area 114b, radio 102f may determine its current location relative to the location of geo-fence 104 using the coordinates of intermediate area 114b and radio 102f will not need to independently query FNE 106 to determine whether or not it is within geo-fence 104.

In another example, if radio 102f moves from intermediate area 114a and if radio 102f is still located within outer area 112, radio 102f may determine whether or not it is located in another intermediate area. If radio 102f determines that it is not located within an intermediate area, radio 102f may query FNE 106 to determine whether it is still operating inside or outside of geo-fence 104. In response to the query from radio 102f, FNE 106 may define a new intermediate area (not shown), including the current location of radio 102f and located within outer area 112 and within or outside of geo-fence 104, depending on the location of radio 102f. FNE 106 broadcasts or otherwise transmits information for the new intermediate area to radios 102 and identifies the new intermediate area as being within or outside of geo-fence 104. Accordingly, radios in outer area 112 only need to query FNE 106 when the radios are outside of an intermediate area 114. Furthermore, a response to one query from FNE 106 may be used by one or more radios 102 to determine their current locations relative to a geo-fence, thereby decreasing the communication traffic between radios 102 and FNE 106.

Figure 2:
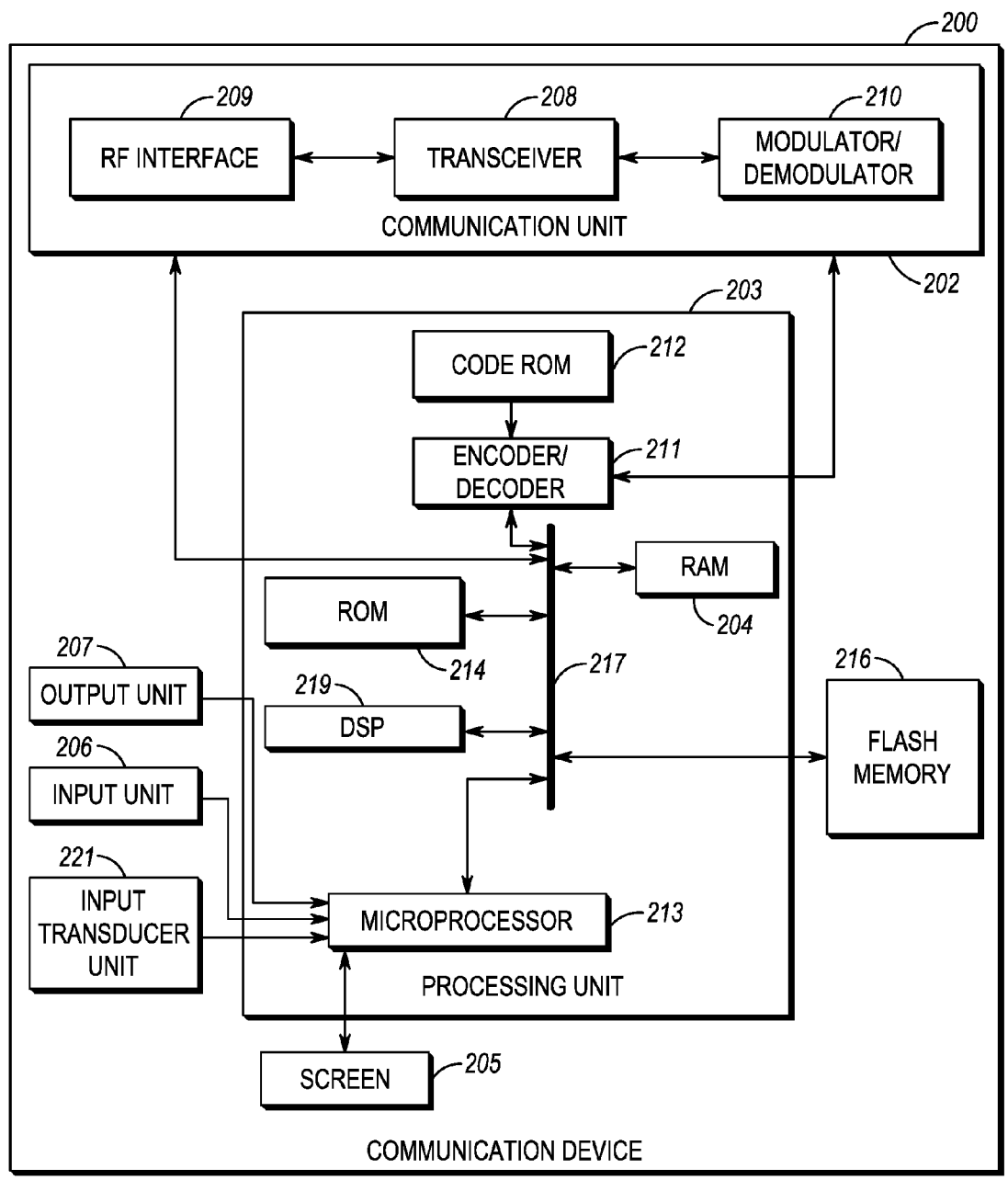
FIG. 2 is a block diagram of a communication device used in accordance with some embodiments.

FIG. 2 is a block diagram of a communication device 200, for example, radio 102, used in accordance with some embodiments. Communication device 100 may include a communications unit 202 coupled to a common data and address bus 217 of a processor 203. Communication device 200 may also include an input unit (e.g., keypad, pointing device, etc.) 206, an output transducer unit (e.g., speaker) 207, an input transducer unit (e.g., a microphone) (MIC) 221, and a display screen 205, each coupled to be in communication with the processor 203.

The processor 203 may include, that is, implement, an encoder/decoder 211 with an associated code read-only memory (ROM) 212 for storing data for encoding and decoding voice, data, control, or other signals that may be transmitted or received by communication device 200. The processor 203 may further include one or more of a microprocessor 213 and digital signal processor (DSP) 219 coupled, by the common data and address bus 217, to the encoder/decoder 211 and to one or more memory devices, such as a read only memory (ROM) 214, a random access memory (RAM) 204, and a static memory 216. One or more of ROM 214, RAM 204 and flash memory 216 may be included as part of processor 203 or may be separate from, and coupled to, the processor 203. The encoder/decoder 211 may be implemented by microprocessor 213 or DSP 219, or may be implemented by a separate component of the processor 203 and coupled to other components of the processor 203 via bus 217.

Communications unit 202 may include an RF interface 209 configurable to communicate with network components, and other user equipment within its communication range. Communications unit 202 may include one or more broadband and/or narrowband transceivers 208, such as an Long Term Evolution (LTE) transceiver, a Third Generation (3G) (3GGP or 3GGP2) transceiver, an Association of Public Safety Communication Officials (APCO) Project 25 (P25) transceiver, a Digital Mobile Radio (DMR) transceiver, a Terrestrial Trunked Radio (TETRA) transceiver, a WiMAX transceiver perhaps operating in accordance with an IEEE 802.16 standard, and/or other similar type of wireless transceiver configurable to communicate via a wireless network for infrastructure communications. Communications unit 202 may also include one or more local area network or personal area network transceivers such as Wi-Fi transceiver perhaps operating in accordance with an IEEE 802.11 standard (e.g., 802.11a, 802.11b, 802.11g), or a Bluetooth transceiver. The transceivers may be coupled to a combined modulator/demodulator 210 that is coupled to the encoder/decoder 111.

Figure 3:
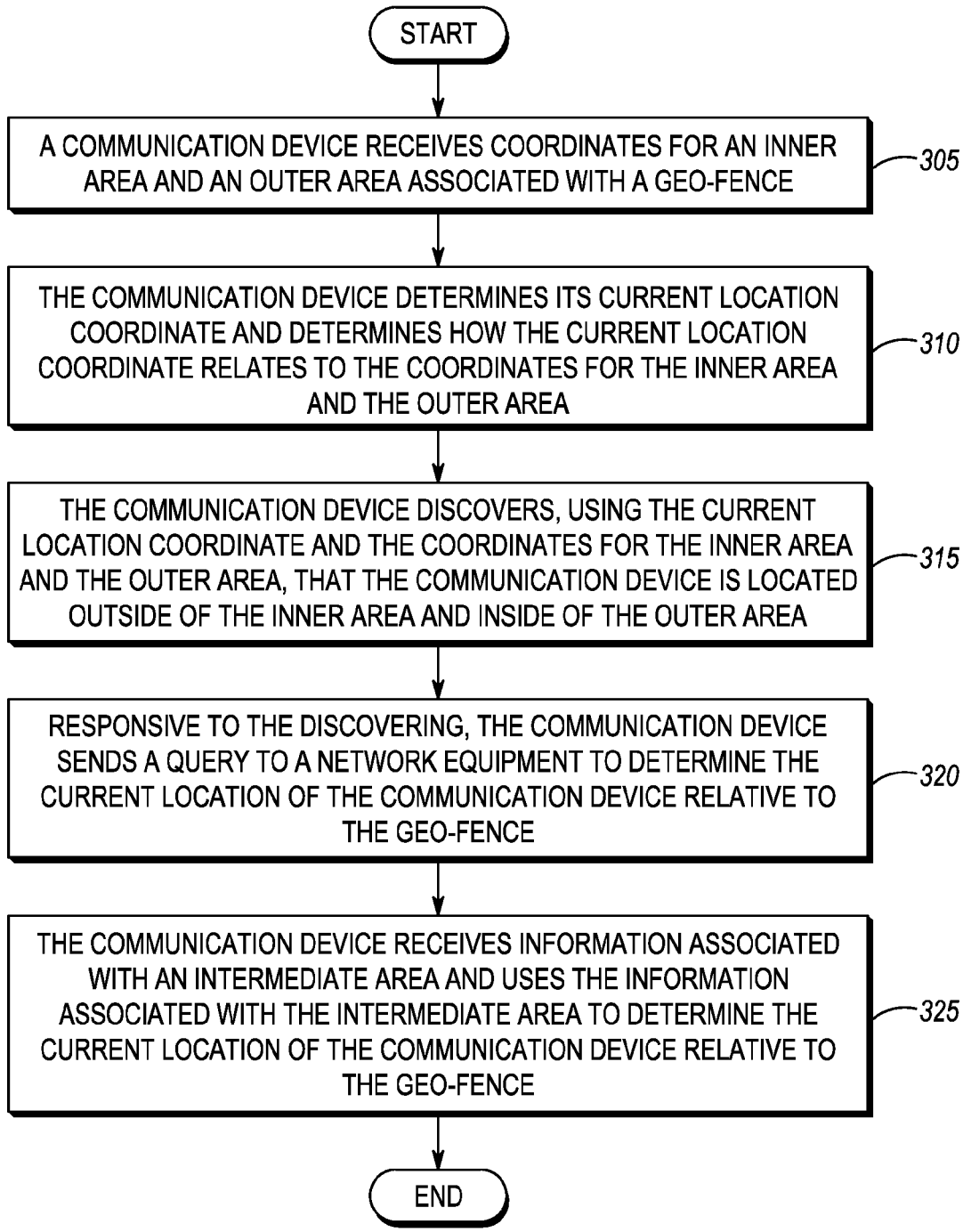
FIG. 3 is a flow diagram of a method implemented in accordance with some embodiments.

The one or more memory devices 212, 214, 216 are configured to store non-transitory computer-executable instructions and code for decoding or encoding data such as control, request, or instruction messages, channel change messages, and/or data or voice messages that may be transmitted or received by communication device 200 and other programs and instructions that, when executed by the processor 203, provide for the device 200 to perform a set of functions and operations in response to executing the instructions described herein as being performed by such a device, such as the implementation of the encoder/decoder 211 and one or more of the steps set forth in FIG. 3.

FIG. 3 is a flow diagram of a method 300 implemented in accordance with some embodiments. At 305, a communication device receives coordinates for an inner area and an outer area associated with a geo-fence. At 310, the communication device determines its current location coordinate and determines how the current location coordinate relates to the coordinates for the inner area and the outer area. At 315, the communication device discovers, using the current location coordinate and the coordinates for the inner area and the outer area, that the communication device is located outside of the inner area and inside of the outer area. At 320, responsive to the discovering, the communication device sends a query to a network equipment to determine the current location of the communication device relative to the geo-fence. At 325, the communication device receives information associated with an intermediate area and uses the information associated with the intermediate area to determine the current location of the communication device relative to the geo-fence.

Figure 4:
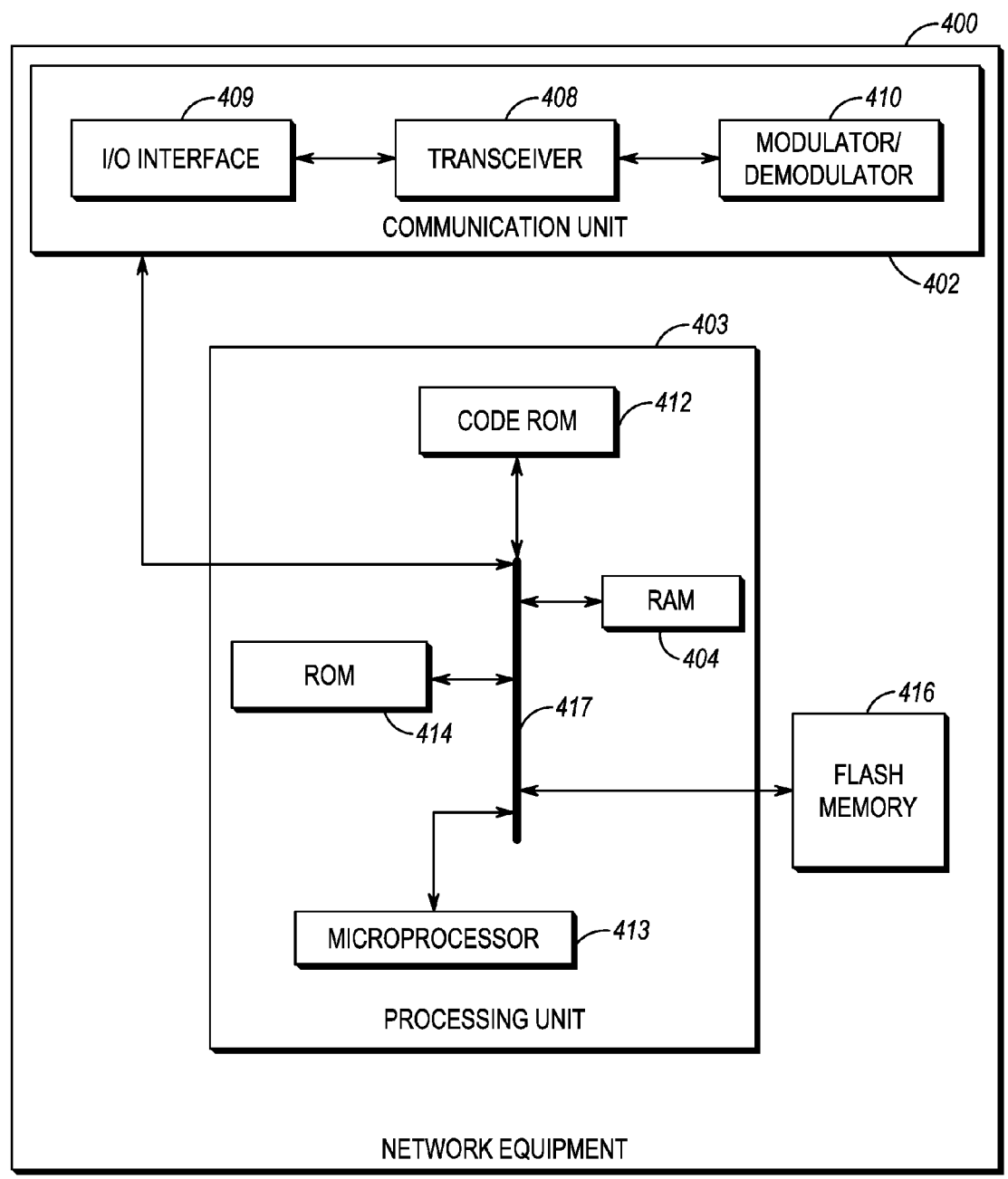
FIG. 4 is a block diagram of network equipment.

FIG. 4 is a block diagram of network equipment 400, such as FNE 106 of FIG. 1, used in accordance with some embodiments. Network equipment 400, for example, may include a communications unit 402 coupled to a common data and address bus 417 of a processor 403. The processor 403 may include a code read-only memory (ROM) 412 for storing data for initializing system components of network equipment 400. The processor 403 may further include a microprocessor 413 coupled, by the common data and address bus 417, to one or more memory devices, such as a read only memory (ROM) 414, a random access memory (RAM) 404, and/or a static memory 416. One or more of ROM 414, RAM 404 and flash memory 416 may be included as part of processor 403 or may be separate from, and coupled to, the processor 403.

Communications unit 402 may include a wired or wireless input/output I/O interface 409 configurable to communicate with network components and other user equipment within its communication range. Communications unit 402 may include one or more broadband and/or narrowband transceivers 408, such as an Long Term Evolution (LTE) transceiver, a Third Generation (3G) (3GGP or 3GGP2) transceiver, an Association of Public Safety Communication Officials (APCO) Project 25 (P25) transceiver, a Digital Mobile Radio (DMR) transceiver, a Terrestrial Trunked Radio (TETRA) transceiver, a WiMAX transceiver perhaps operating in accordance with an IEEE 802.16 standard, and/or other similar type of wireless transceiver configurable to communicate via a wireless network for infrastructure communications. Communications unit 402 may also include one or more local area network or personal area network transceivers such as Wi-Fi transceiver perhaps operating in accordance with an IEEE 802.11 standard (e.g., 802.11a, 802.11b, 802.11g), or a Bluetooth transceiver. The transceivers may be coupled to a combined modulator/demodulator 410. The one or more memory devices 412, 414 and 416 are configured to store non-transitory computer-executable instructions to perform a set of functions such as one or more of the steps set forth in FIG. 5.

Figure 5:
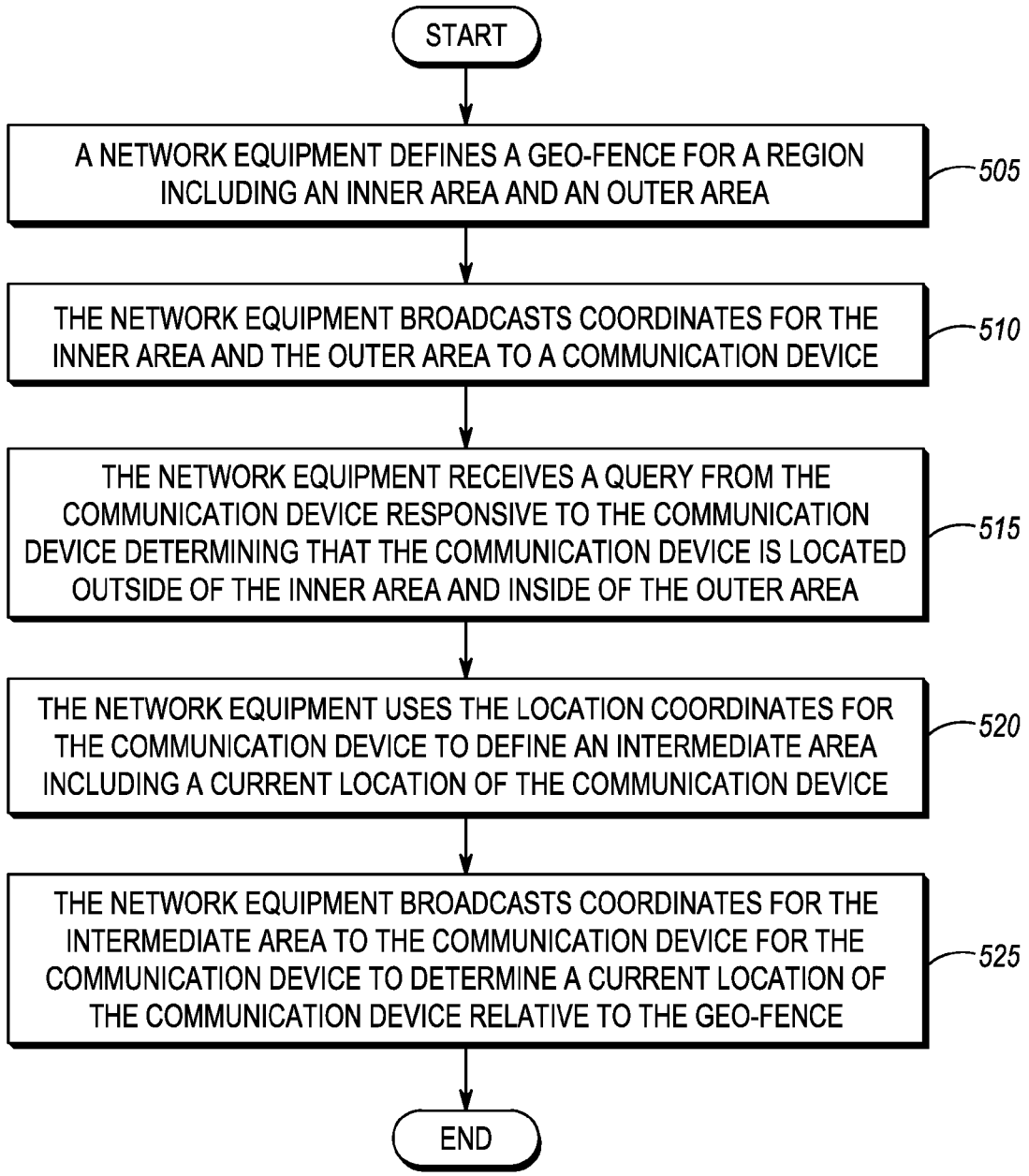
FIG. 5 is a flow diagram.

FIG. 5 is a flow diagram of a method 500 implemented in accordance with some embodiments. At 505, a network equipment defines a geo-fence for a region including an inner area and an outer area. At 510, the network equipment broadcasts coordinates for the inner area and the outer area to a communication device. At 515, the network equipment receives a query from the communication device responsive to the communication device determining that the communication device is located outside of the inner area and inside of the outer area. At 520, the network equipment uses the location coordinates for the communication device to define an intermediate area including a current location of the communication device. At 825, the network equipment broadcasts coordinates for the intermediate area to the communication device for the communication device to determine a current location of the communication device relative to the geo-fence.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method comprising:
    receiving, by a communication device, coordinates for a regularly-shaped inner area that is fully enclosed within an associated irregularly-shaped geofence and a regularly-shaped outer area that fully encloses the associated irregularly-shaped geo-fence;
    determining, by the communication device, a current location coordinate for the communication device and determining, as a function of the current location coordinate and the received coordinates for the inner area and the outer area, where the communication device is located relative to the inner and outer areas and thus to the irregularly-shaped geofence;
    when the communication device determines that the communication device is located outside of the inner area but inside of the outer area, and is thus located within an intermediate area only a portion of which is located within the irregularly-shaped geo-fence, the communication device responsively transmitting a request to network equipment requesting further information further defining the irregularly-shaped geo-fence within the intermediate area;
    the communication device receiving the further information further defining a portion of the irregularly-shaped geo-fence within the intermediate area that includes the current location coordinate of the communication device; and
    the communication device determining, as a function of the further information, whether the communication device is located within the irregularly-shaped geofence within the intermediate area.

2. The method of claim 1, wherein the current location coordinate for the communication device is within the irregularly-shaped geo-fence, and the further information further defines a largest regularly-shaped area inside the irregularly-shaped geo-fence that is outside the inner area and inside the outer area and includes the current location coordinate for the communication device.

3. The method of claim 1, wherein the current location coordinate for the communication device is outside of the irregularly-shaped geo-fence and the further information further defines a largest regularly-shaped area outside the irregularly-shaped geo-fence and that is outside the inner area and inside the outer area and includes the current location coordinate for the communication device.

4. The method of claim 1, wherein a second communication device with a current location coordinate located outside of the inner area and inside of the outer area also receives the further information and uses the further information to determine whether the second communication device is inside of or outside of the irregularly-shaped geo-fence in the intermediate area.

5. The method of claim 1, further comprising:
moving, by the communication device, from the portion of the irregularly-shaped geo-fence within the intermediate area further defined by the further information;
discovering, by the communication device, using a new current location coordinate for the communication device and the coordinates for the inner area and the outer area, that the communication device is located outside of the inner area, inside of the outer area, and outside the portion of the irregularly-shaped geo-fence within the intermediate area further defined by the further information; and
responsive to the discovering, sending a second request, by the communication device, to the network equipment requesting still further information further defining the irregularly-shaped geo-fence within the intermediate area.

6. The method of claim 1, wherein when the communication device determines that the communication device is located outside of the inner area and outside of the outer area, the communication device determining that it is operating outside of the irregularly-shaped geo-fence and the communication device refraining from transmitting a request to network equipment requesting further information further defining the irregularly-shaped geo-fence within the intermediate area.

7. The method of claim 1, wherein when the communication device determines that the communication device is located inside the inner area, the communication device determining that it is operating inside the irregularly-shaped geo-fence and the communication device refraining from transmitting a request to network equipment requesting further information further defining the irregularly-shaped geo-fence within the intermediate area.

8. The method of claim 1, wherein the inner area is a region located within the irregularly-shaped geo-fence and wherein a first region in the outer area is located within the irregularly-shaped geo-fence and a second region in the outer area is located outside of the irregularly-shaped geo-fence.

9. A communication device, comprises:
a memory configured to store non-transitory computer-executable instructions;
a transceiver configured to receive coordinates for coordinates for a regularly-shaped inner area that is fully enclosed within an associated irregularly-shaped geo-fence and a regularly-shaped outer area that fully encloses the associated irregularly-shaped geo-fence;
a processor configured to perform a set of functions including:
determine a current location coordinate for the communication device and determine, as a function of the current location coordinate and coordinates for the inner area and the outer area, where the communication device is located relative to the inner and outer areas and thus to the irregularly-shaped geo-fence;
when the determination of where the communication device is located relative to the inner and outer areas is that the communication device is located outside of the inner area but inside of the outer area, and is thus located within an intermediate area only a portion of which is located within the irregularly-shaped geo-fence, transmit a request to network equipment requesting further information further defining the irregularly-shaped geo-fence within the intermediate area;
receive the further information further defining a portion of the irregularly-shaped geo-fence within the intermediate area that includes the current location coordinate; and
determine, as a function of the further information, whether the communication device is located within the irregularly-shaped geo-fence within the intermediate area.

10. The communication device of claim 9, wherein the current location coordinate for the communication device is within the irregularly-shaped geo-fence, and the further information further defines a largest regularly-shaped area inside the irregularly-shaped geo-fence that is outside the inner area and inside the outer area and includes the current location coordinate for the communication device.

11. The communication device of claim 9, wherein the current location coordinate for the communication device is outside of the irregularly-shaped geo-fence and the further information further defines a largest regularly-shaped area outside the irregularly-shaped geo-fence and that is outside the inner area and inside the outer area and includes the current location coordinate for the communication device.

12. The communication device of claim 9, wherein the processor is further configured to:
detect movement from the portion of the irregularly-shaped geo-fence within the intermediate area further defined by the further information;
discover, using a new current location coordinate for the communication device and the coordinates for the inner area and the outer area, that the communication device is located outside of the inner area, inside of the outer area, and outside the portion of the irregularly-shaped geo-fence within the intermediate area further defined by the further information; and
responsive to the discovering, send a second request, by the communication device, to the network equipment requesting still further information further defining the irregularly-shaped geo-fence within the intermediate area.

13. The communication device of claim 9, wherein the processor is further configured to, when the determination is that the communication device is located outside of the inner area and outside of the outer area, determine that it is operating outside of the irregularly-shaped geo-fence and refrain from transmitting a request to network equipment requesting further information further defining the irregularly-shaped geo-fence within the intermediate area.

14. The communication device of claim 9, wherein the processor is further configured to, when the determination is that the communication device is located inside the inner area, determine that it is operating inside the irregularly-shaped geo-fence and refrain from transmitting a request to network equipment requesting further information further defining the irregularly-shaped geo-fence within the intermediate area.

15. The communication device of claim 9, wherein the inner area is a region located within the irregularly-shaped geo-fence and wherein a first region in the outer area is located within the irregularly-shaped geo-fence and a second region in the outer area is located outside of the irregularly-shaped geo-fence.

16. A network equipment, comprises:
   a memory configured to store non-transitory computer-executable instructions;
   a transceiver configured to receive location coordinates for a communication device;
   a processor configured to perform a set of functions including:
      define an irregularly-shaped geo-fence definition defining a region, generating, from the irregularly-shaped geo-fence definition, a regularly-shaped inner area definition that is fully enclosed within the irregularly-shaped geo-fence and a regularly-shaped outer area definition that fully encloses the irregularly-shaped geo-fence;
      broadcast coordinates for the inner area definition and the outer area definition for the associated irregularly-shaped geo-fence definition to the communication device;
      receive a query from the communication device responsive to the communication device determining that the communication device is located outside of the inner area but inside of the outer area, and is thus located within an intermediate area only a portion of which is located within the irregularly-shaped geo-fence;
      use current location coordinates for the communication device to generate further information further defining the irregularly-shaped geo-fence within the intermediate area that includes the current location coordinates; and
      broadcast the further information further defining the irregularly-shaped geo-fence within the intermediate area to the communication device for the communication device to use in determining whether the communication device is located within the irregularly-shaped geo-fence within the intermediate area.

* * * * *